United States Patent [19]
Sakai et al.

[11] Patent Number: 5,153,417
[45] Date of Patent: Oct. 6, 1992

[54] BAR CODE READER USING HOLOGRAMS

[75] Inventors: Yasuyuki Sakai, Kariya; Atsushi Hashikawa, Okazaki; Masahiro Taguchi, Hazu, all of Japan

[73] Assignees: Nippondenso Co., Ltd., Kariya; Nippon Soken, Inc., Nishio, both of Japan

[21] Appl. No.: 562,865

[22] Filed: Aug. 6, 1990

[30] Foreign Application Priority Data

Aug. 4, 1989 [JP] Japan .................. 1-203648
Jun. 18, 1990 [JP] Japan .................. 2-159564

[51] Int. Cl.⁵ .............................................. G06K 7/10
[52] U.S. Cl. ........................................ 235/457; 235/467
[58] Field of Search ................ 235/457, 467, 472; 350/3.71; 359/209, 211

[56] References Cited

U.S. PATENT DOCUMENTS

| | | | |
|---|---|---|---|
| 4,224,509 | 9/1980 | Cheng | 235/457 |
| 4,235,504 | 11/1980 | Ikeda et al. | 359/3 |
| 4,415,224 | 11/1983 | Dickson | 350/3.71 |
| 4,540,247 | 9/1985 | Nishi et al. | 350/3.71 |
| 4,647,143 | 3/1987 | Yamazaki et al. | 350/3.71 |
| 4,678,288 | 7/1987 | Lonsdale et al. | 235/472 |
| 4,794,237 | 12/1988 | Ferrante | 235/457 |
| 4,999,482 | 3/1991 | Yang | 235/457 |

FOREIGN PATENT DOCUMENTS

| | | |
|---|---|---|
| 59-187315 | 10/1984 | Japan . |
| 61-36722 | 2/1986 | Japan . |
| 61-45216 | 3/1986 | Japan . |
| 61-128383 | 6/1986 | Japan . |

Primary Examiner—John W. Shepperd
Attorney, Agent, or Firm—Cushman, Darby & Cushman

[57] ABSTRACT

A bar code reader includes a hologram receiving a scanning light beam in sequence from a scanning light beam source for directing the scanning light beam to a bar code to be read along one path so that the bar code is scanned with the scanning laser beam in two-dimensional directions, and for guiding the scanning light beam to a photo-detector along the same path after the scanning light beam is reflected from the bar code, a condenser lens disposed in an optical system between the photo-detector and the hologram for collecting the reflected scanning light beam into the photo-detector, and a light blocking member disposed in an optical system between the condenser lens and the hologram for blocking unwanted light from the photo-detector, which unwanted light advances toward an incident side of the hologram on which the scanning light beam is directed.

41 Claims, 13 Drawing Sheets

BAR CODE READER USING HOLOGRAMS

BACKGROUND OF THE INVENTION

1. Field of the Invention

The present invention relates to a bar code reader using holograms for reading the bar code of a bar code label attached to each of the goods to be monitored.

2. Description of the Prior Art

Various bar code readers are known as disclosed in Japanese Patent Publication No. 61-53757, for example. In the disclosed bar code reader, diffracting action of holograms is utilized to route a laser beam in a scanning pattern for scanning the bar code of a bar code label. Light reflected from the thus scanned bar code is collected by again utilizing the diffracting action of the holograms, and the collected reflected light is then detected to read the information on the bar code of the bar code label.

With the known bar code reader thus constructed, the scanning laser beam directed to the holograms advances along one path and the reflected light returning back from the holograms advances along the same path. Consequently, it occurs likely that unwanted light generated toward the incident side of the holograms, that is, scattered light or unwanted diffracted light caused by the diffracting action of the holograms advances toward a detector along the path of the reflected light and then detected by the detector as an optical noise, thereby deteriorate the reading accuracy of the bar code reader. This problem becomes significant when the distance between the detector and a bar code to be read is relatively long and light reflected from the bar code is weak.

One solution to the foregoing problem is proposed in Japanese Patent Publication No. 59-22992 wherein an absorption pipe is provided to absorb or otherwise cut light reflected from holograms acting as a scanner. Since the holograms having a light-collecting function are used also as a condenser lens, light incident upon the holograms must be divergent light. Accordingly, if a collimated or parallel beam of light such as a laser beam is used ad the incident light, then an adjustment is needed to convert the laser beam to the divergent light.

SUMMARY OF THE INVENTION

With the foregoing drawbacks of the prior art in view, it is an object of the present invention to provide a bar code reader incorporating structural features which are capable of reading the bar code at an increased accuracy by considerably reducing optical noises generated from the incident portion of a scanning means to which a scanning beam is directed, and also provide an increased degree of freedom for the kind of incident light use.

A bar code reader of the present invention comprises: means for generating a scanning light beam; means for detecting the scanning light beam after it is reflected from a bar code to be read; a hologram receiving the scanning light beam in sequence from the generating means for directing the scanning light beam to the bar code along one path so that the bar code is scanned with the scanning laser beam in two-dimensional directions, and for guiding the scanning light beam to the detecting means along substantially the same path after the scanning light beam is reflected from the bar code; means disposed in an optical system between the detecting means and the hologram for collecting the reflected scanning light beam into the detecting means; and a light blocking member disposed in an optical system between the collecting means and the hologram for blocking unwanted light advancing toward an incident side of the hologram on which the scanning light beam is directed, from the detecting means.

With this construction, the scanning light beam generated from the generating means is directed onto the hologram and routed by diffraction of the hologram to scan the bar code. During the scanning, the scanning light beam is reflected by the bar code, and the reflected scanning light beam is guided to the detecting means along substantially the same path as the scanning light beam has passed. The detecting means reads the information on the bar code in accordance with the reflected scanning light beam. The light blocking member blocks from the detecting means, unwanted light which advances toward the incident side of the hologram. With this light blocking member, the unwanted light, such as light scattering from the hologram, is prevented from being picked up as an optical noise simultaneously with detection of the reflected scanning light beam. This arrangement is particularly advantageous when the detecting means is far distant from the bar code to be read and hence the reflected scanning light beam is weak. Since the reflected scanning light beam is collected into the detecting means by the collecting means, the hologram no longer needs to have a lens action. Consequently, the scanning light beam incident to the hologram may be a parallel beam of light. With this increased degree of freedom for the kind of incident light, a certain degree of misalignment between the light beam generating means and the hologram is permitted, which facilitates the manufacture of the bar code reader.

The above and other objects, features and advantages of the present invention will become more apparent from the following description when making reference to the detailed description and the accompanying sheets of drawings in which preferred structural embodiments incorporating the principles of the present invention are shown by way of illustrative example.

DETAILED DESCRIPTION OF THE PREFERRED EMBODIMENTS

The present invention will be described below in greater detail with reference to certain preferred embodiment shown in the accompanying drawings.

Figure 1:
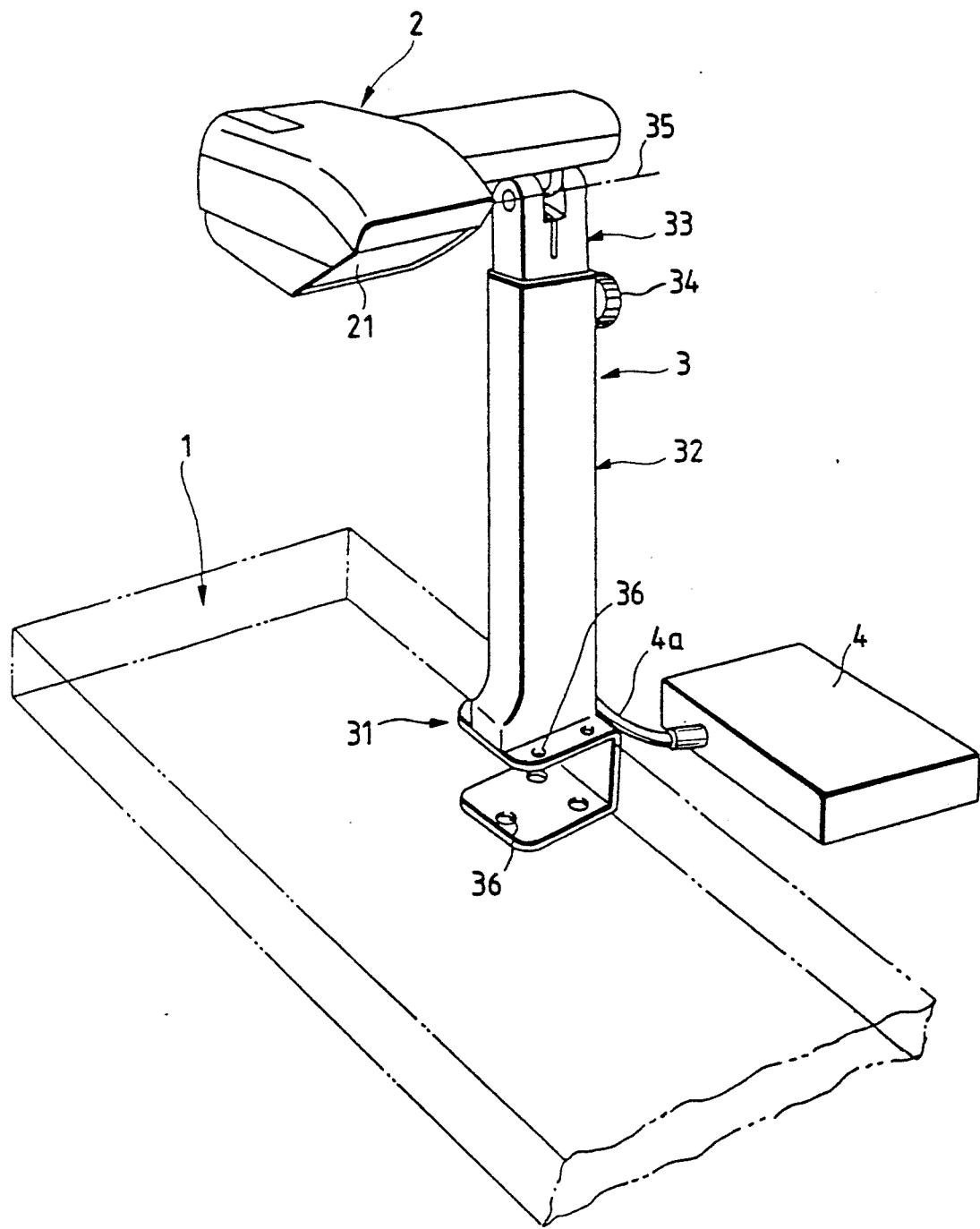
FIG. 1 is a perspective view of a bar code reader according to an embodiment of the present invention.

FIG. 1 illustrates a bar code reader of the present invention as it is disposed on a cash register counter.

The cash register counter includes a counter table 1 on which a scanning unit 2 of the bar code reader is supported by a support unit 3. The scanning unit 2 is electrically connected with a control circuit 4 by a cable 4a extending through the support unit 3 for the transfer of a laser beam source, a motor driving signal, a reading signal, and an electric power between the scanning unit 2 and the control circuit 4.

The support unit 3 includes a base 31 secured to the counter table 1, a first tubular support column 32 fixed to and upstanding from the base 31, and a second tubular support column 33 slidably received in the first tubular support column 32. The base 31 has a plurality of holes o6 through which screw fasteners (not shown) extend to mount the bar code reader on the counter table 1.

The second support column 33 received in the first support column 32 is vertically movable and can be locked at any desired position by a set screw 34. The scanning unit 2 is pivoted to an upper end of the second support column 33 and pivotally movable in a vertical plane about a horizontal axis 35.

Figure 2:
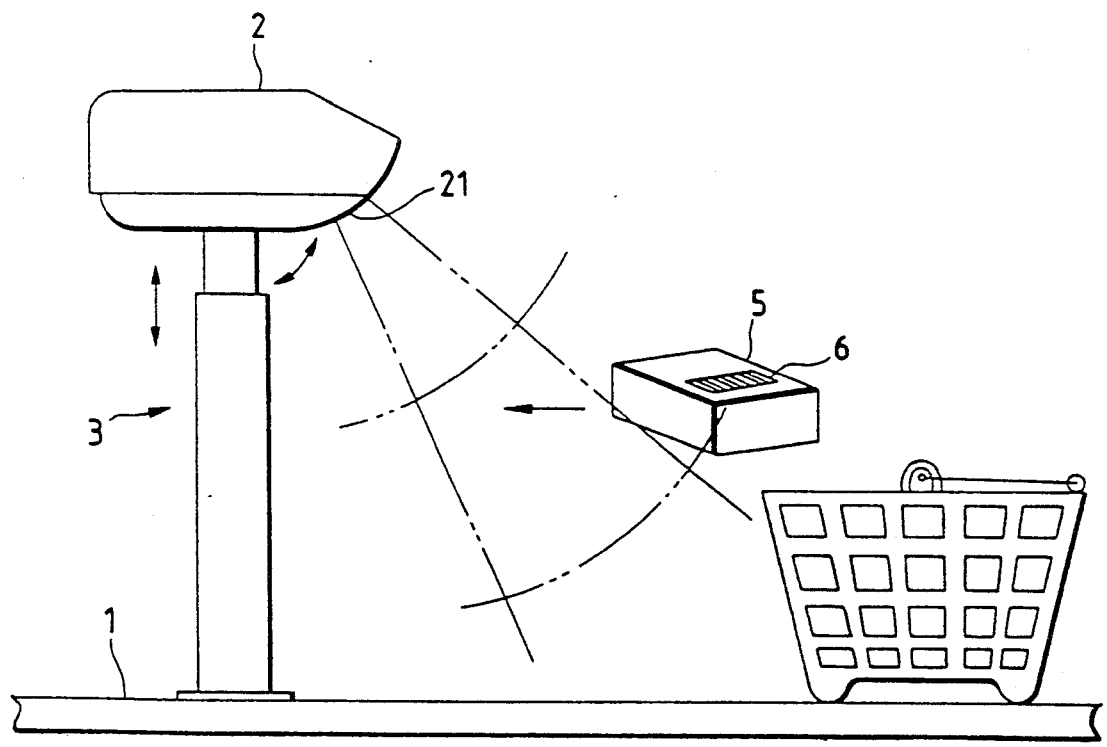
FIG. 2 is a front elevational of the bar code reader as it is used for reading a bar code label attached to a good.

The bar code reader of the invention is used in the condition as shown in FIG. 2.

The scanning unit 2 disposed over the counter table 1 emits a reading laser beam through a reading window 21 onto a path of travel of goods at an angle of approximately 45 degrees toward an incoming good 5 so as to scan with the reading laser beam a zone defined between two-dotted chain lines. When the cashier moves the good 5 in the direction of the arrow into the scanning zone, a bar code 6 which is generally printed on the surface of a bar code label attached to the outer surface of the good 5 is read. The information on the bar code thus read is decoded by the control circuit 4 and then delivered to a POS (point-of-sale) terminal device (not shown) for the calculation of the volume of sales, etc.

Figure 3:
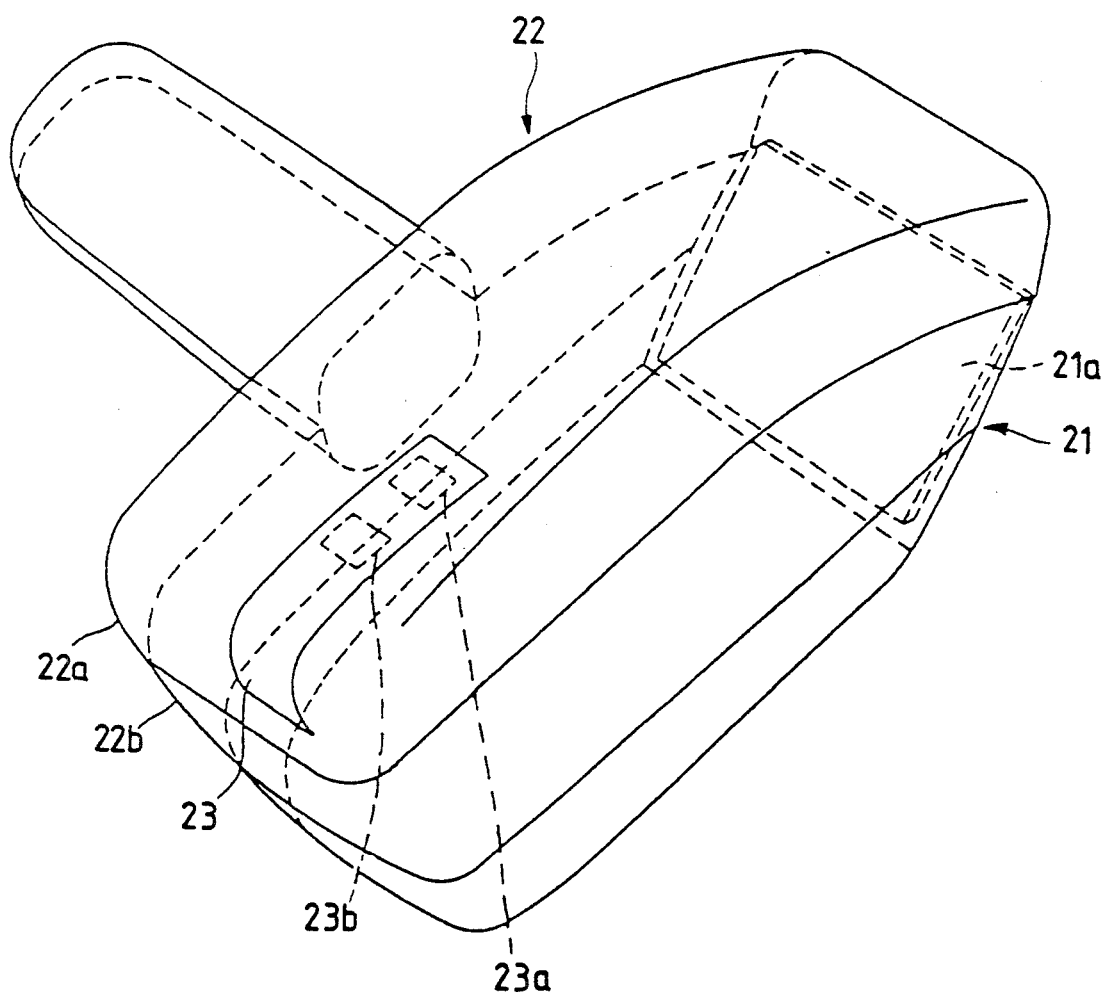
FIG. 3 is an enlarged perspective view of a scanning unit of the bar code reader.

The construction of the scanning unit 2 will be described below in greater details with reference to FIGS. 3 through 6, in which FIG. 3 illustrates the scanning unit as viewed from the upper left thereof.

The scanning unit 2 includes a case 22 composed of an upper case member 22a and a lower case member 22b joined together and has the reading window 21 stated above and a display window 23.

The reading window 21 is closed by a transparent glass 21a, while the display window 23 is provided with a colored transparent plastic plate. A light emitting diode (LED) 23a and another light emitting diode (LED) 23b are disposed in the case 22 below the display window 23 for indicating the power-on state and the fault bar code reading operation, respectively.

Figure 4:
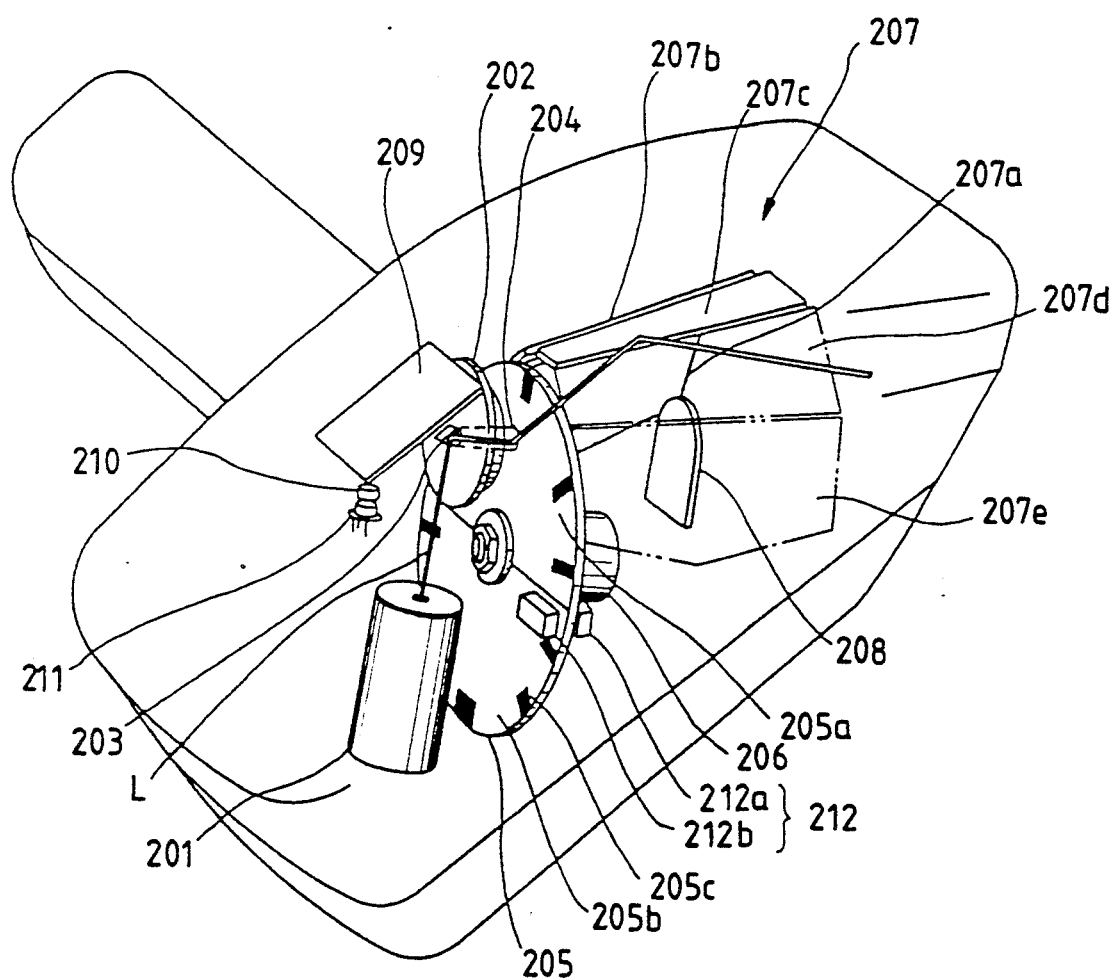
FIG. 4 is a perspective view showing the interior of the scanning unit.
Figure 5:
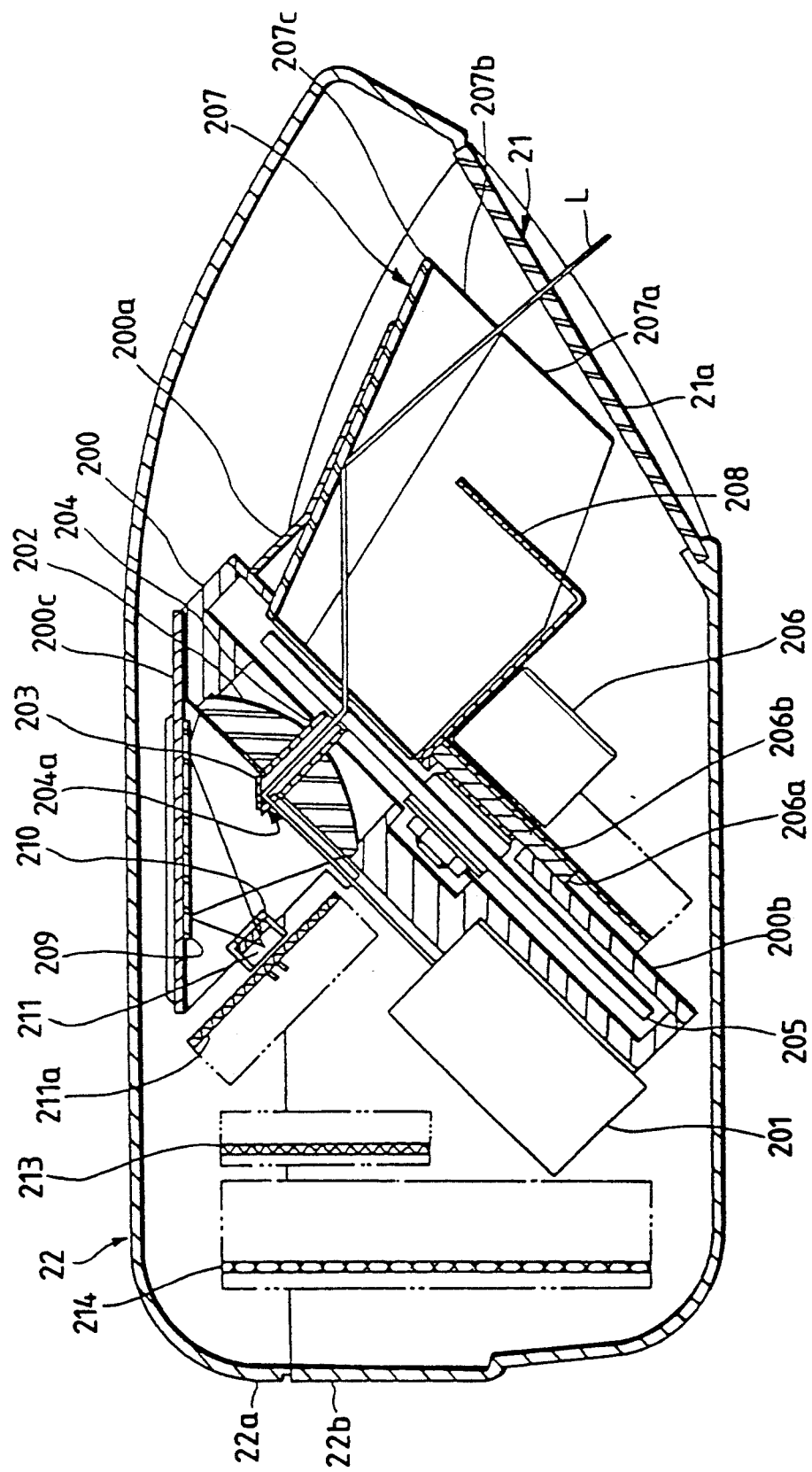
FIG. 5 is a cross-sectional view of the scanning unit.

FIG. 4 is a perspective view showing the arrangement of components of an optical system disposed in the case 22 and FIG. 5 is a vertical cross-sectional view of the scanning unit 2.

The scanning unit 2 includes a chassis 200 (FIG. 5) connected to the second support column 33 and constitutes a mechanical frame extending through the interior of the scanning unit 2. The chassis 200 has a large rigidity in view of the accuracy of the optical system described later.

A semiconductor laser beam source 201 is mounted on the chassis 200 for emitting a laser beam L as a collimated or parallel beam of light. The semiconductor laser beam source 201 contains a visible radiation semiconductor laser and a lens system. The laser beam L is reflected by a reflecting mirror 203 provided on a condenser lens 202, then moves through a light shield or blocking tube 204 and impinges on a circular hologram disk 205 at a right angle thereto. The reflecting mirror 203 is provided on an input end of the light blocking tube 204 at an angle of 45 degrees relative to a longitudinal axis of the light blocking tube 204. The input end of the light blocking tube 204 has a cutout recess 204a aligned with the semiconductor laser beam source 201 so that the laser beam L directed onto the reflecting mirror 203 through the cutout recess 204a is reflected by the reflecting mirror 203 in a direction to advance along the longitudinal axis of the light blocking tube 204.

Figure 6:
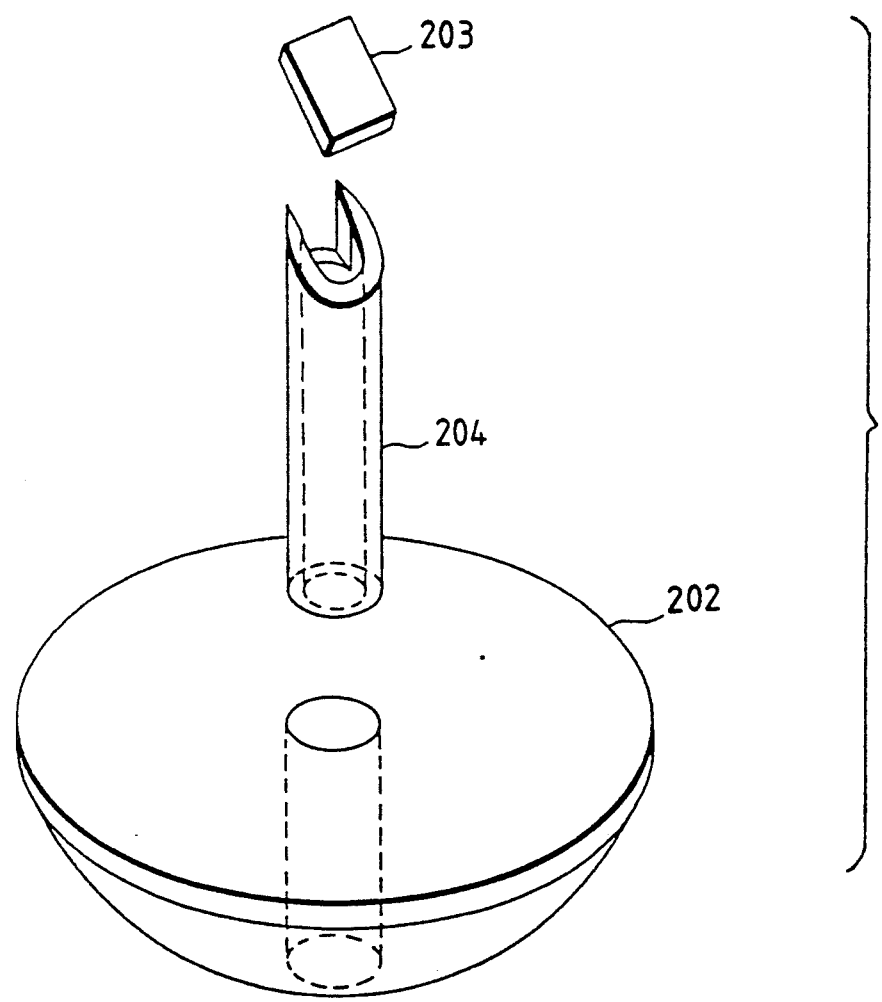
FIG. 6 is an exploded perspective view of a light shield tube incorporated in the scanning unit.

As shown in FIG. 6, the light blocking tube 204 extends through the condenser lens 202 along the central optical axis thereof and terminates adjacent to the hologram disk 205. The hologram disk 205 disposed obliquely in the case 22 and has formed thereon a first hologram 205a and a second holograms 205b which have different focal lengths and different diffraction angles, each of the first and second holograms 205a, 205b circumferentially extending over an angle of 180 degrees. The holograms 205a, 205b diffract and converge the laser beams impinging thereon in sequence.

The hologram disk 205 is rotated by a motor 206 whereupon each of the first and second holograms 205a, 205b diffracts the laser beam passing therethrough and lets the outgoing laser beam scan a semiconductor range extending through an angle of 180 degrees. The laser beam L going out from the hologram disk 205 is reflected by a polygonal reflecting mirror assembly 207 composed of five flat reflecting mirrors 207a–207e arranged side-by-side juxtaposition and having one side (lower side) open, and subsequently the reflected laser beam is emitted from the reading window 21.

The respective reflecting mirros 207a–207e is fixedly supported by a sub-chassis 200a detachably connected to the chassis 200, so that the scanning pattern, described later, and the number of scanning lines can be changed by replacing the polygonal reflecting mirror assembly 207 and the sub-chassis 200a in assembled condition to another set of a polygonal reflecting mirror assembly having three, four of six reflecting mirrors and a sub-chassis.

The hologram disk 205 is fixedly mounted on a shaft of the motor 206 extending through a sub-chassis 200b, a motor base 206a and a printed-circuit board 206b. The hologram disk 205 is received in a downwardly facing circular recess which is formed in the chassis 200 and closed by the sub-chassis 200b. The hologram disk 205 thus received is protected from contamination with dust and dirt and also prevented from flying out when it is broken. The motor 206 is of the outer rotor type and mounted on the sub-chassis 200b together with the motor base 206a and the printed-circuit board 206b having a driver circuit for driving the motor 206. A light blocking plate 208 extends from the sub-chassis 200b for shielding or blocking light which is transmitted between the holograms and the reading window 21 without being subjected to reflection by one of the reflecting mirrors 207a-207e.

Figure 7:
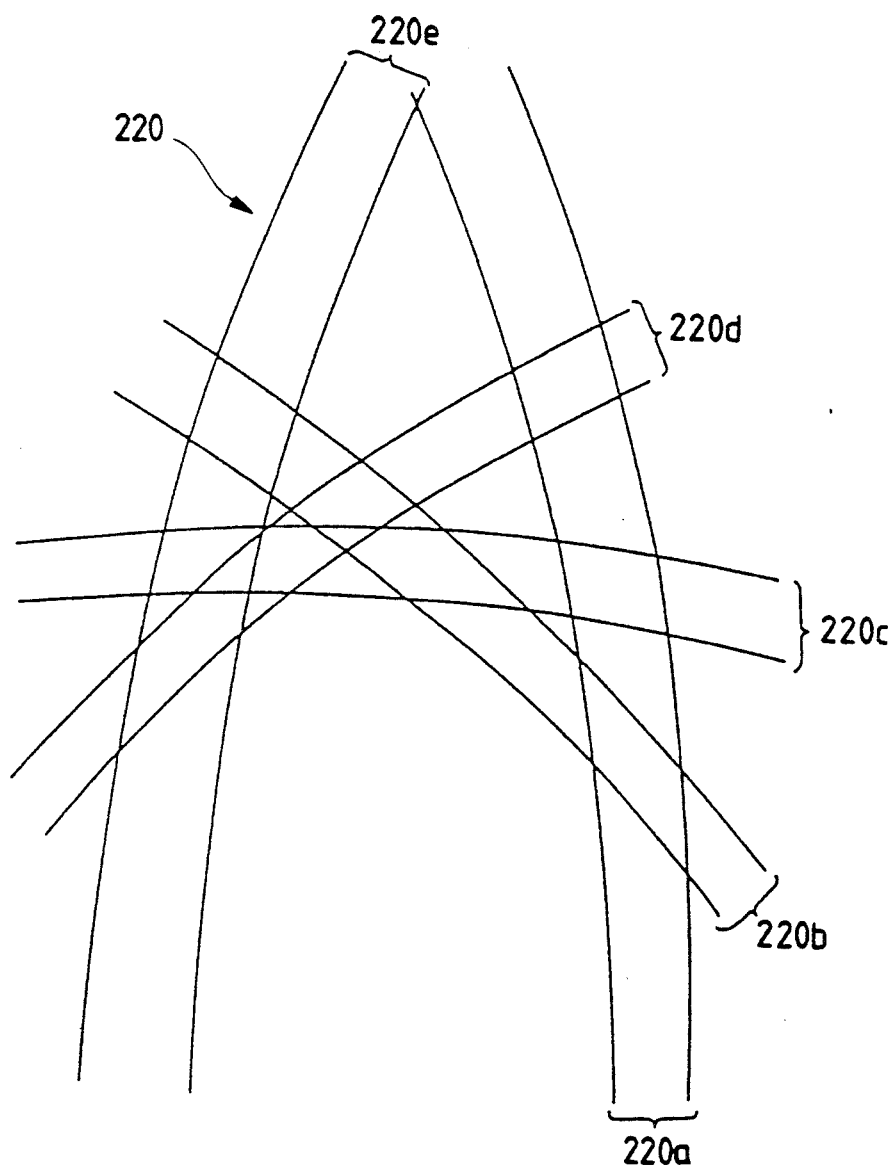
FIG. 7 is a plan view showing a scanning pattern formed by the scannign unit.

After the scanning and convergence by the holograms 205a, 205b, the laser beam is reflected by the polygonal reflecting mirror assembly 207 to scan the bar code 6 (FIG. 2) of the bar code label attached to the good 5 in a scanning pattern 200 shown in FIG. 7.

The scanning pattern 220 shown in FIG. 7 includes five pairs of spaced scanning lines 220a-220e, each scanning line pair being formed by one of the reflecting mirrors 207a-207e. One of each pair of the scanning lines 220a-220e is formed by the first hologram 205a, while the other of each pair of the scanning lines 220a-220e is formed by the second hologram 205b.

As shown in FIG. 4, a photo-interrupter 212 is disposed on a predetermined position of the chassis 200 and is composed of a light emitting element 212e and a light sensitive element 212b confronting each other across the thickness of the hologram disk 205. The hologram disk 205 is provided with a plurality of circumferentially spaced opaque marks 205c at positions corresponding in position to the leading ends (start) and the trailing ends (end) of the respective scanning lines. The marks 205 are detected by the photo-interrupter 212 so that the leading and trailing ends of each scanning line is detected. One of the marks 205c (the bottom mark in the illustrated embodiment) is wider than the remainder so that each revolution of the hologram disk 205 is detected by monitoring a longer duration of a detected pulse signal supplied from the photo-interrupter 212 when the wider mark 205c intersects the photo-interrupter 212.

When the laser beam scans the bar code with the scanning pattern shown in FIG. 7, the scanning spot of the laser beam moves across the respective bars of the bar code whereupon the laser beam is reflected by the bar code label. The intensity of the reflected laser beam changes in accordance with the reflectivity of the respective bars and spaces between the adjacent bars.

The reflected laser beam goes back into the reading window 21 along substantially the same path as the scanning laser beam has passed to scan the bar code, then is reflected by one of the reflecting mirrors 207a-207e which has reflected the scanning laser beam when the bar code is scanned, and subsequently impinges upon the hologram disk 205.

The reflected laser beam is diffracted again by the first and second holograms 205a, 205b of the hologram disk 205 and collected by the condenser lens 202. The condenser lens 202 is fixed to the chassis 200. Thereafter, the reflected laser beam is reflected by a reflecting mirror 209 toward a bandpass filter 210 which transmits light having a particular band of frequencies. The reflected laser beam finally is focused on a photo-detector 211 which in turn produces a train of electric pulses equivalent to the information on the scanned bar code.

The reflection mirror 209 is fixed to a sub-chassis 200c extending from the chassis 200. The sub-chassis 200c is so designed as to surround a portion of the light path which extends from the condenser lens 202 through the reflecting mirror 209 to the photo-detector 211, thereby blocking disturbance light from the photo-detector 211. The photo-detector 211 is mounted on a printed-circuit board 211a fixedly mounted on the chassis 200, which printed-circuit board 211a includes an amplifier circuit, a driver circuit, etc.

The scanning unit 2 further includes printed-circuit boards 213, 214 (FIG. 5) disposed in the case 22. The printed-circuit boards 213, 214 include various electric circuits such as a driver circuit for the laser diode incorporated in the semiconductor laser source 201, a signal processing circuit for processing signals from the photo-interrupter 212, an amplifier circuit for amplifying signals from the photo-detector 211, driver circuits for the light emitted diodes 23a, 23b, and a power circuit. These electric conduits are connected to the control circuit 4 via the cable 4a.

The bar code reader thus constructed is of the overhead type in which a bar code reading unit or portion is disposed above a path of movement of the goods bearing the bar code labels to be scanned. In the overhead-type bar coder reader, it is preferable that the scanning unit 2 is compact in size. The scanning unit 2 of the invention incorporates various structural features which are contributable to the reduction of the overall size of the scanning unit 2, as described below.

The hologram disk 205 is disposed obliquely in the scanning unit so that the overall height of the scanning unit is relatively small.

The first and second holograms 205a, 205b each extend over an angle of 180 degrees about the center of the hologram disk 205 (namely, each hologram 205a, 205b extends along half of the full circumferences of the hologram disk 205) and hence scan the laser beam within a semicircular range extending over an angle of 180 degrees. As a results, the polygonal reflecting mirror assembly 207 disposed behind the hologram disk 205 for the formation of the scanning pattern extends substantially along half of the full circumference of the hologram disk 205 (that is, within an angular range of 180 degrees). This arrangement is effective for the formation of a flat scanning unit.

With the polygonal reflecting mirror assembly 207 extending substantially over an angle of 180 degrees of a circle, the motor 206 for driving the hologram disk 205 can be disposed on the open side of the polygonal reflecting mirror assembly 207 within the range of a complementary angle of 180 degrees of the same circle. This arrangement of the motor 206 is contributable to the reduction of the size of the scanning unit 2. More particularly, since the motor 206 is disposed below the polygonal reflecting mirror assembly 207, the center of gravity of the bar code reader is relatively low.

With the view of minimizing the size of the scanning unit 2, the optical system of the scanning unit 2 preferably is as simple as possible. According to the illustrated embodiment, the scanning laser beam diffracted by the holograms 205a, 205b is subjected to only one reflection by the polygonal reflecting mirror assembly 207 before it is emitted from the scanning unit 2. In consequence of this construction, the laser beam incident upon the holograms 205a, 205b is necessarily directed toward the reading window 21. With this arrangement, the laser beam which is directed from the semiconductor laser beam source 201 onto the hologram disk 205 may contain a transmitted light component which makes a straight advance to the reading window 21 without being diffracted by the holograms 205a, 205b and goes out from the reading window 21. The transmitted light component is reflected by the good, and the reflected transmitted light component may be detected by the photo-detector 211 as an optical noise. According to the invention, the transmitted light component, if present, is blocked by the light blocking plate 208 before it reaches the good 5 through the reading window 21. The light blocking plate 208 is substantially coextensive to the opening area of the condenser lens 202 so that light coming from the reading window 21 into the scanning unit 2 is prevented by the light blocking plate 208 from arriving directly at the photo-detector 211. Rather, light incident upon the photo-detector 211 is limited to the light which is reflected by one of the reflecting mirrors 207a-207e and thereafter diffracted by one of the holograms 205a, 205b. Thus, a considerable reduction of the optical noises can be attained.

Furthermore, the light blocking tube 204 disposed in front of the hologram disk 205 extends close to the hologram disk 205. Thus, unwanted light, such as unwanted diffracted light coming from the hologram disk 205 and scattered light returning from the hologram disk 205 when the hologram disk 205 is irradiated with the laser beam projected from the semiconductor laser beam source 201, are prevented by the light blocking tube 204 from impinging upon the phot-detector 211. The optical noise can, therefore, be reduced.

According to the illustrated embodiment, the condenser lens 202 serves also as means for supporting the light blocking tube 204. This arrangement obviates the need for a separate support provided for the light blocking tube 204.

Since the condenser lens 202 is disposed between the hologram disk 205 and the photo-detector 211, the hologram disk 205 is no longer required to have a lens action. In case of a hologram disk having the lens action, the laser beam incident upon this hologram disk must be divergent light. On the contrary, with the use of the hologram disk 205 of the invention, the laser beam incident upon the hologram disk 205 may be a collimated or parallel beam of light. Thus, the degree of freedom for the kind of the incident light can be extended. When the scanning unit 2 is used with a parallel beam of light, a certain degree of misalignment is permitted between the laser beam source 201 and the hologram disk 205. This means that an error which may occur in assembling the condenser lens 202 with the chassis 200 can be accommodated and hence the bar code reader can be assembled without difficulty.

The outermost two reflecting mirrors 207a and 207e of the polygonal reflecting mirror assembly 207 are larger in width than the remainder and extend downward beyond the angular range of 180 degrees stated above so as to compensate the light collecting abiltity when the reflected light produced along the scanning lines corresponding to the reflecting mirrors 207a, 207e is collected.

The operation of the bar code reader will be described below in connection with the optical system of the scanning unit 2, the electric circuits contained in the scanning unit 2 and the control circuit 4.

When a power switch (not shown) is turned on, the power LED 23a comes on the hologram disk 205 is rotated by the motor 206. The rotational speed of the hologram disk 205 is increased to such an extent that the rotating hologram disk 205 can scan a laser beam at sufficiently high speeds. Then the hologram disk 205 is kept in a steady-state rotation, and a laser beam is generated from the semiconductor laser beam source 201. When the rotational speed of the hologram disk 205 slows down, the generation of the laser beam is interrupted so as to prevent the same point from being irradiated with the laser beam for a prolonged period of time.

The laser beam is diffracted by the holograms 205a, 205b and subsequently reflected by the polygonal reflecting mirror assembly 207. The reflecting laser beam forms a scanning beam focussed on a position which is spaced from the reading window 21 by a predetermined distance. The scanning beam thus formed moves in the scanning pattern shown in FIG. 7 as the hologram disk 205 rotates.

When one of the scanning line of the scanning pattern shown in FIG. 7 intersects the bar code of the bar code label, the scanning laser beam is reflected by the bar code label. The intensity of the reflected laser beam changes in accordance with the reflectivity of the individual bars and spaces therebetween. The reflected laser beam goes back toward the hologram disk 205 along substantially the same path as the scanning laser beam has passed and umpinges upon the holograms 205a, 205b. Thereafter, the reflected laser beam passes through the condenser lens 202 and the bandpass filter 210 and impinges upon the photo-detector 211. The photo-detector 211 in turn produces a train of electric pulse signals which are equivalent to the information on the bar code of the bar code label.

During that time, the photo-interrupter 212 issues timing signals indicative of the leading and trailing ends of each scanning line 220a-220e. The electric pulse signals from the photo-detector 211 are separated and discriminated as signals obtained by reflection from the respective scanning lines 200a-220a. When a train of electric pulse signals indicative of the information on the bar code is obtained, this train of electric pulse signals is decoded and the output signals are then transmitted to a central processing unit incorporated in the control circuit 4 (FIG. 1).

As described above, the bar code reader of the invention has a scanning unit 2 which is compact in size and capable of performing a multi-directional scanning. Since the scanning unit 2 is disposed above the counter table and emits scanning beams obliquely and downwardly, the cashier is able to observe the bar code while the latter is being read by the bar reader.

Figure 8:
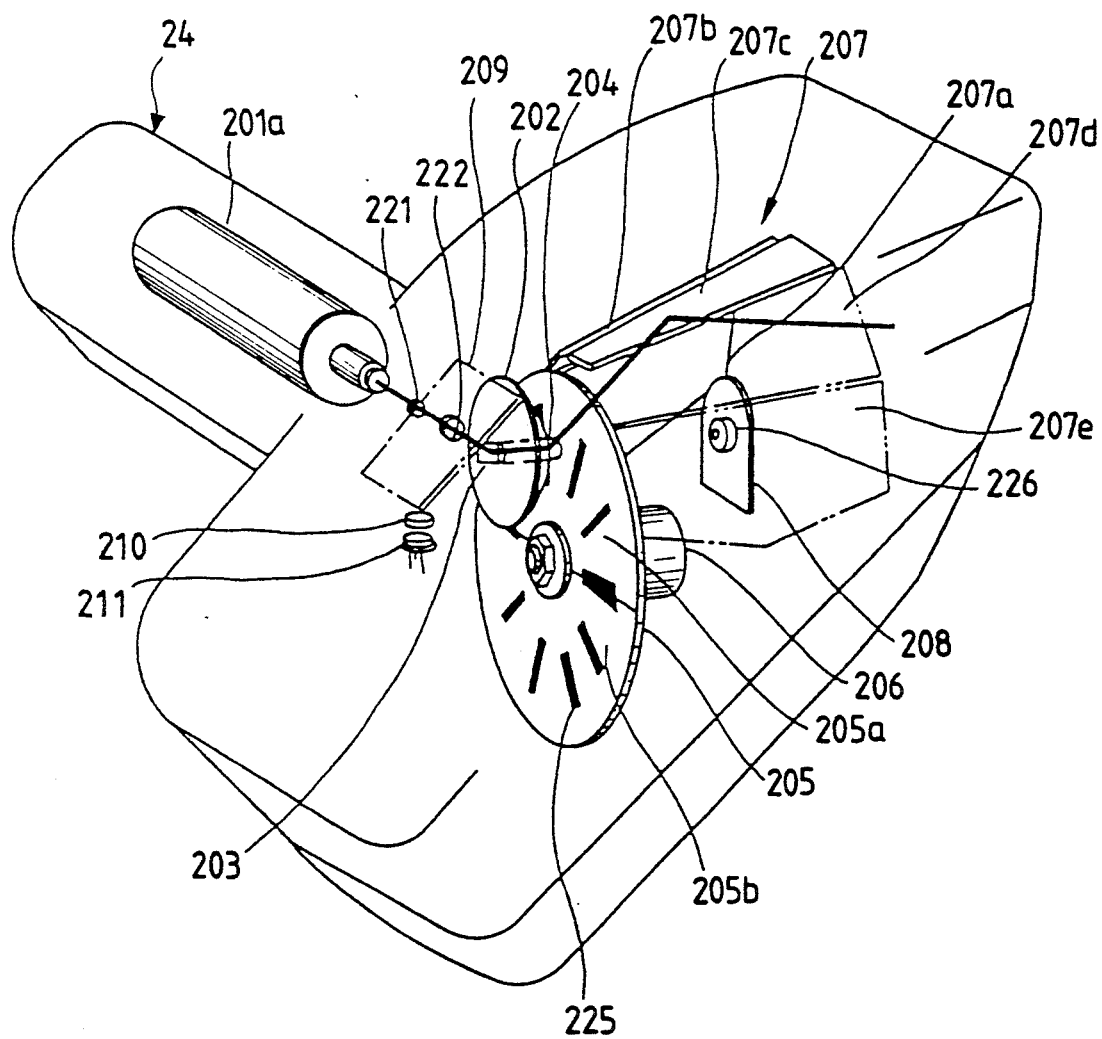
FIG. 8 is a perspective view showing the interior of a scanning unit according to another embodiment.

FIG. 8 shows a scanning unit according to another embodiment of the invention. This scanning unit is structurally similar to the scanning unit shown in FIG. 4 and due to this structural similarity, a description will be given to a point of difference. These parts which are identical to those shown in FIG. 4 are designated by identical reference characters.

The scanning unit includes a laser beam source comprised of a helium-neon (He-Ne) laser tube 201a. The He-Ne laser tube 201a is disposed in a hollow lateral projection 24 of the scanning unit. The lateral projection 24 contains a chassis (not shown but similar to the chassis 200 shown in FIG. 5) extending from the joint between the lateral projection 24 and the second support column 33 (see FIG. 1). The He-Ne laser tube 201a is fixedly mounted on the chassis. The He-Ne laser tube 201a generates a laser beam which in turn is adjusted in diameter by lenses 221, 222. The laser beam having an adequate diameter is then reflected by a reflecting mirror 203, and the reflected laser beam impringes upon a hologram disk 205. Subsequently, the laser beam is routed to scan the bar code in a multi-directional mode as described with respect to the embodiment shown in FIG. 4.

The hologram disk 205 has a plurality of circumferentially spaced marks 225 which correspond in position to the position of the leading and trailing ends of the respective scanning lines 220a–220e.

A photo-detector 226 is disposed on a light blocking plate 208 and located at a position where light transmitted through the hologram disk 205 and making a straight advance to the photo-detector 226 is detecte*d by the photo-detector 226. During rotation of the hologram disk 205, the marks 225 successively intersect the laser beam whereupon transmitted light coming out from the hologram disk 205 is interrupted. Such interruption of the transmitted light is detected by the photo-detector 226. With the photo-detector 226 thus arranged, the leading and trailing ends of each scanning line can be detected without the use of a specific photo-interrupter. One of the marks is wider than the remainder and hence interrupts the transmitted laser beam for a longer period of time. Consequently, by checking this longer interruption of the transmitted light, each revolution of the hologram disk 205 can be detected.

The scanning unit of this embodiment operates substantially in the same manner as the scanning unit shown in FIG. 4 and hence a description is no longer needed.

According to the embodiment shown in FIG. 8, since the He-Ne laser tube 201a is disposed in the lateral projection 24 of the scanning unit, a further reduction of the overall size of the scanning unit is attainable. Due to the structural similarity, the scanning unit shown in FIG. 8 may incorporate a semiconductor laser beam source (identical to the semiconductor laser beam source 201 shown in FIG. 4) in which instance the reflecting mirror 203 is oriented from the He-Ne tube 201a toward the semiconductor laser beam source. Furthermore, the leading and trailing ends of each scanning line can be detected by blocking or interrupting the light transmitted through the hologram disk 205.

Figure 9:
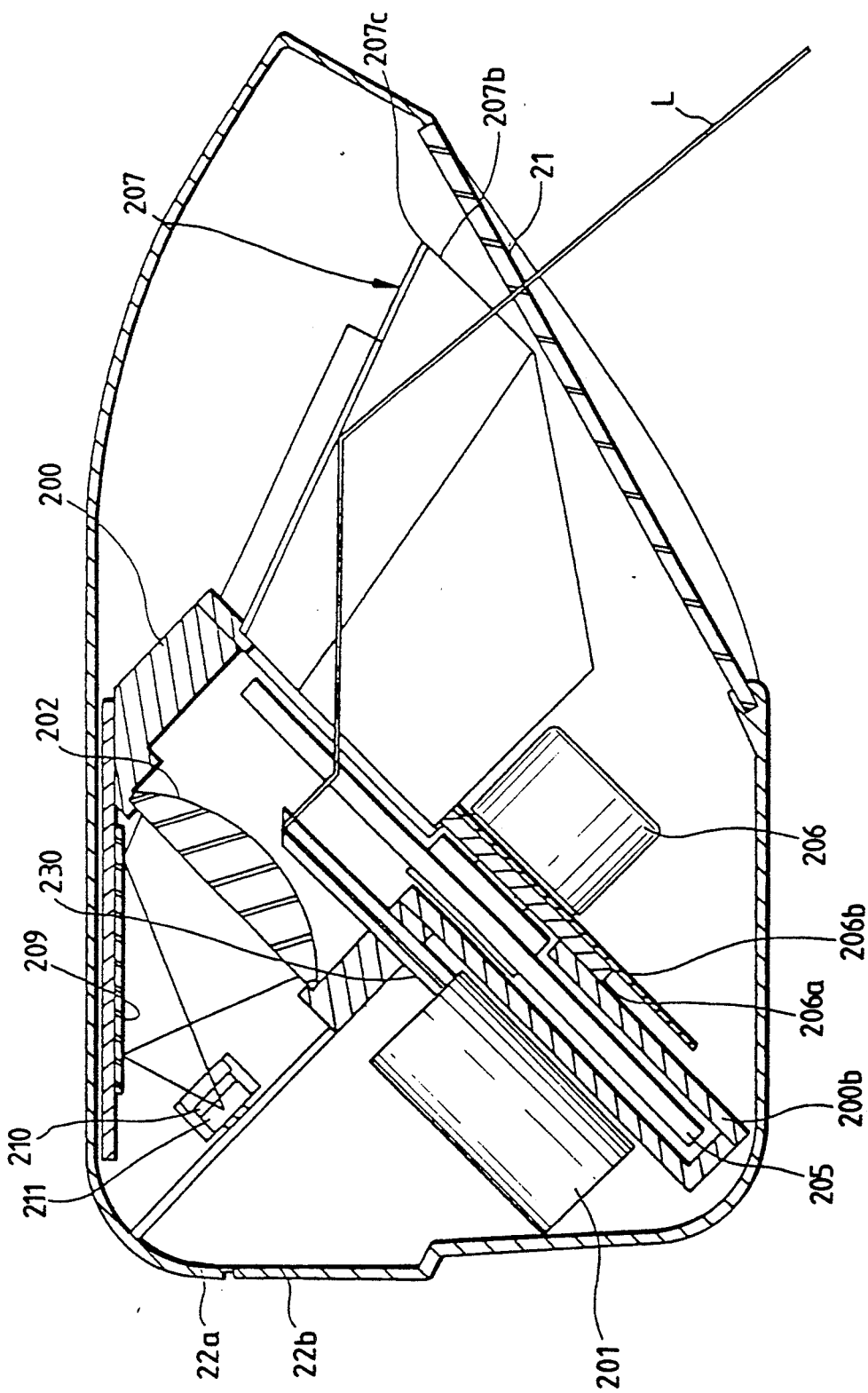
FIG. 9 is a cross-sectional view of a scanning unit according to a further embodiment of the invention.

FIG. 9 cross-sectionally illustrates a scanning unit according to still another embodiment of the present invention. This scanning unit differs from those of the foregoing embodiments in that a light guide member 230 is provided for guiding a laser beam from the semiconductor laser beam source 201 onto the hologram disk 205, in place of a combination of the reflecting mirror 203 and the light blocking tube 204 extending through the condenser lens 202. The light guide member 230 has an elongate structure and is connected at one end to the exit hole of the semiconductor laser beam source 201 for guiding the laser beam to a position immediately beneath the condenser lens 202 and subsequently deflecting the laser beam toward the hologram disk 205. The deflected laser beam then impringes upon the hologarm disk 205.

Figure 10A:
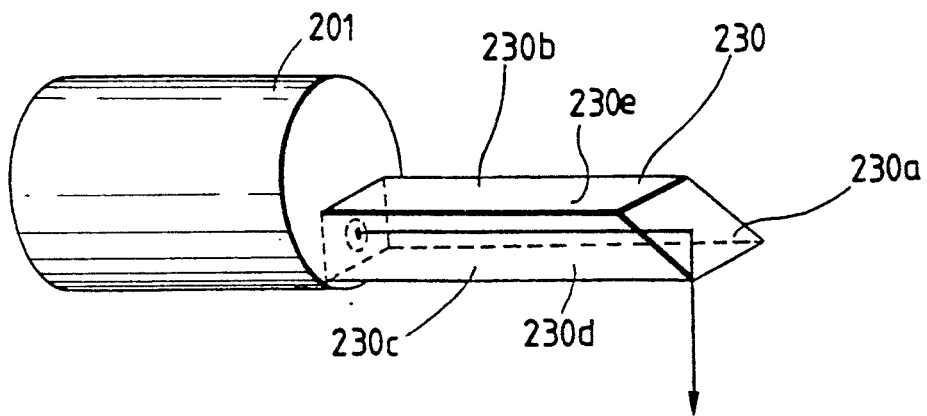
FIG. 10A is a perspective view of a light guide member according to an embodiment of the present invention.
Figure 10B:
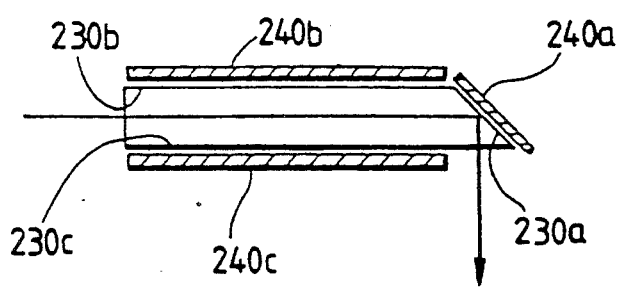
FIG. 10B is a longitudinal cross-sectional view of the light guide member as it is associated with a light shield member.
Figure 10C:
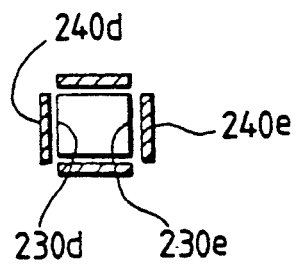
FIG. 10C is a transverse cross-sectional view of FIG. 10B.
Figure 11:
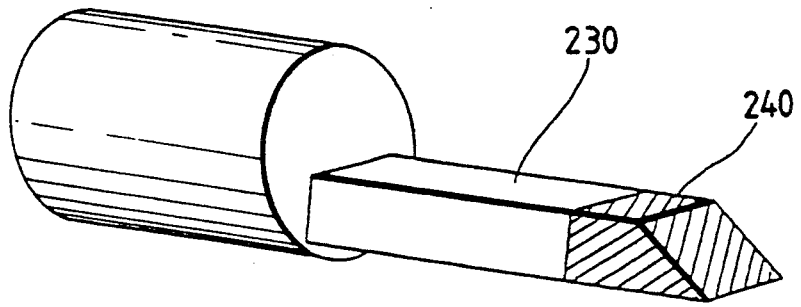
FIG. 11 is a perspective view showing a modified form of the light guide member associated with a light blocking member.
Figure 12:
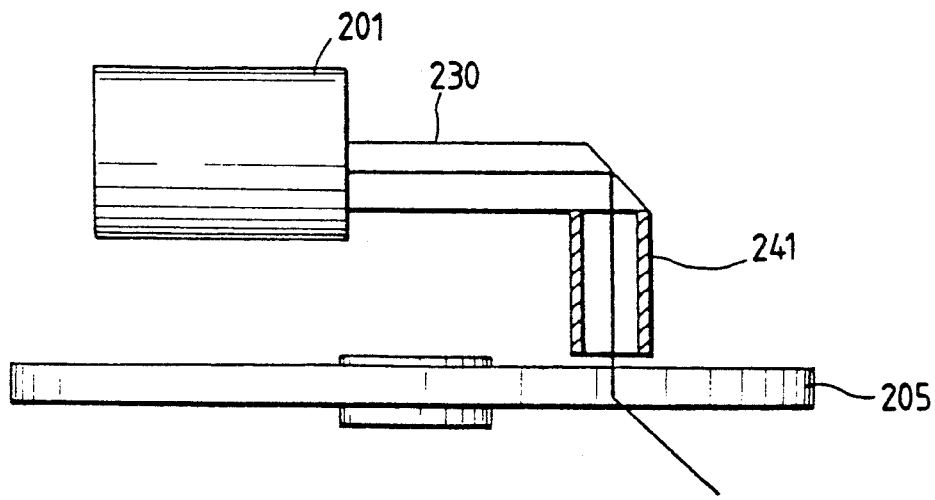
FIG. 12 is a front elevational view of a modified light guide member.

As shown in FIG. 10A, the light guide member 230 is a prism formed from a transparent material such as glass. The laser beam advances along the longitudinal axis of the light guide member 230 toward an oblique end 230 where the laser beam undergoes total reflection and changes its direction of advance. The oblique end 230a is covered with a light blocking member 240a (FIG. 10B) so that the laser beam scattered by the oblique end 230a or by the hologram disk 205 is prevented from advancing toward the photo-detector 211 (FIG. 9). The light blocking member 240 may be comprised of a solid light blocking body or a light blocking coating. Additional to the oblique end 230a, the prism 230 may be covered on all its sides 230b–230e with similar light blocking members 240b–240e, as shown in FIGS. 10B and 10C. The light guide member 230 may be covered only at its distal end portion with a light blocking member 240, as shown in FIG. 11. Alternatively, it is possible to provide a tubular light blocking member 241 extending from the distal end of the light guide member 230 toward the hologram disk 205 and terminating immediately ahead of the hologram disk 205.

Figure 13A:
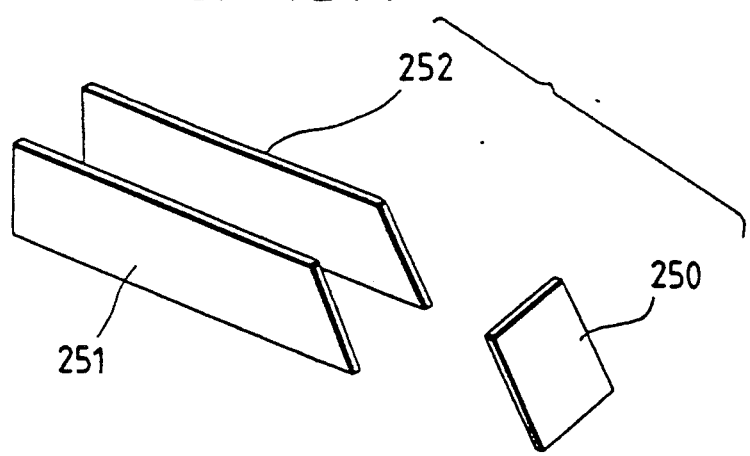
FIG. 13A is an exploded perspective view of another modified form of the light guide member.
Figure 13B:
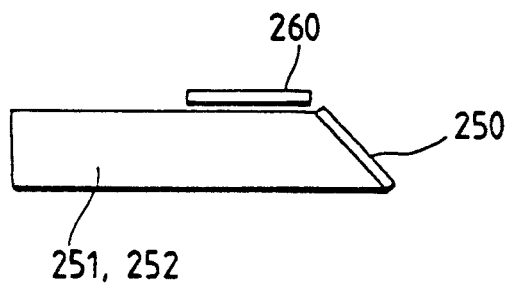
FIG. 13B is a front elevational view of the light guide member of FIG. 13A as it is associated with a light blocking member.

The light guide member 230 is not limited to the prism as described above but includes a light guide member composed of a pair of laterally spaced elongate stays 252 of reflecting mirror supporting at their one end a reflecting mirror 250 in an oblique posture, as shown in FIGS. 13A and 13B. A light blocking member 260 (FIG. 13B) is disposed adjacent to the oblique reflecting mirror 250 and extends over and across the stays 251, 252 for blocking passage of the laser beam which is scatted by the hologram disk 205. The optical noise can, therefore, be reduced. Either one of the stays 251, 252 may be omitted.

Figure 14:
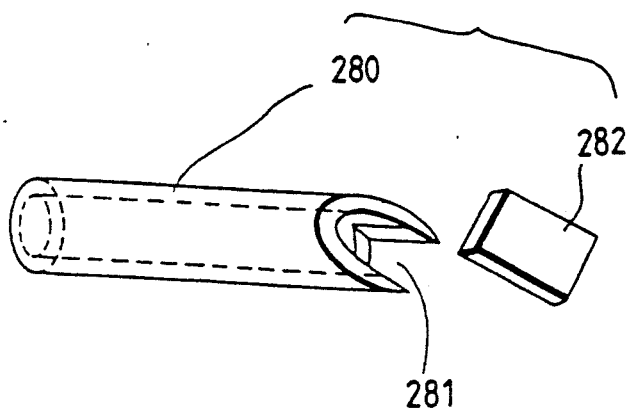
FIG. 14 is a perspective view of another modified light guide member.

FIG. 14 shows a modified light guide member including a tubular stay 280 of reflecting mirror and a reflecting mirror 282 mounted on an oblique end of the tubular stay 280, the stay 280 having at its oblique end an exit hole or aperture 281 through which the laser beam advances after it is reflected by the reflecting mirror 282. The tubular stay 280 also acts as a light blocking member.

Figure 15:
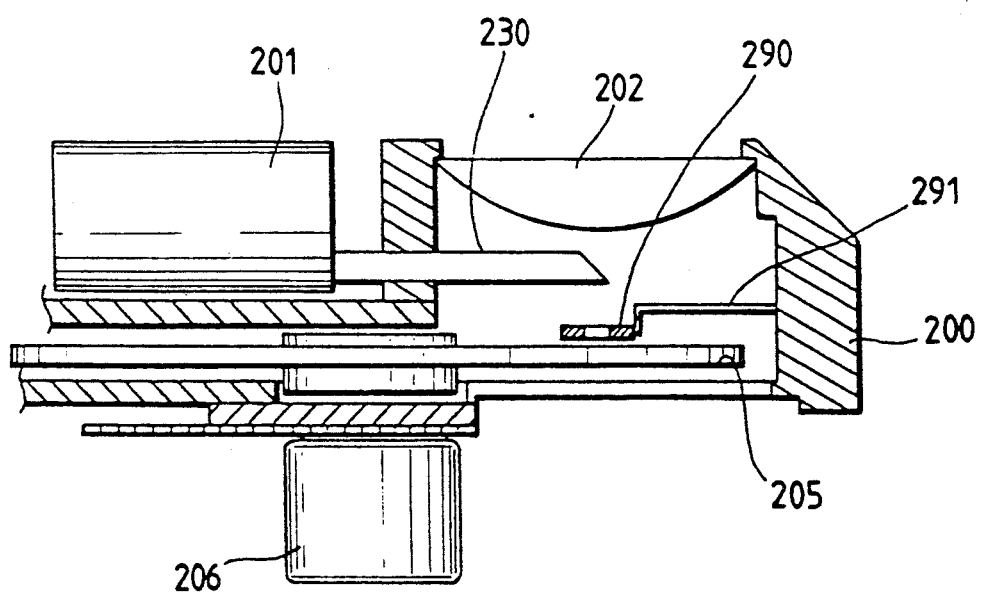
FIG. 15 is a cross-sectional showing a light blocking member according to another embodiment.

As shown in FIG. 15, an apertured plate-like light blocking member 290 may be disposed adjacent to a position on the hologram disk 205 where the laser beam impinges. The apertured light blocking member 290 is supported by an elongate support member 291 extending from the chassis 200.

It is preferable that the light blocking members shown in FIGS. 9 through 15 are disposed close to the hologram disk 205 so as to provide an efficient blocking of the light scattering from the hologram disk 205.

Figure 16:
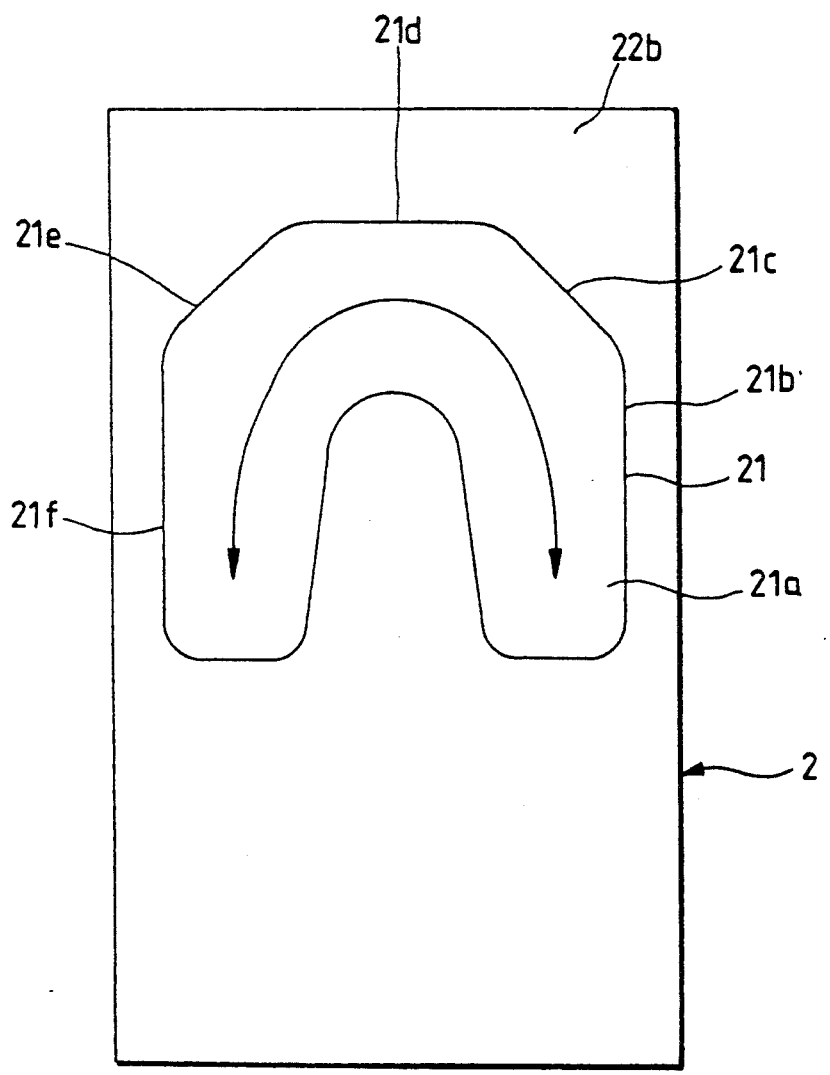
FIG. 16 is a bottom view of a scanning unit.

The light blocking plate 208 shown in FIGS. 4 and 8 may be replaced with a black color plastic film or an opaque plastic film (not shown) which is adhered to the glass 21a in the reding window 21. As an alternative, the light blocking plate 208 may be replaced by a lower case member 22b of the scanning unit 2 which has a substantially U-shaped reading window 21, as shown in FIG. 16. The reading window 21 is complementary in contour to the shape of a scanning zone of the laser beam and is partly defined by five sides 21a–21e which are arranged in alignment with the corresponding ones of the reflecting mirrors 207a–207e of the polygonal reflecting mirror assembly 207.

Obviously various minor changes and modifications of the present invention are possible in the light of the above teaching. It is therefore to be understood that within the scope of the appended claims the invention may be practiced otherwise than as specifically described.

What is claimed is:

1. A bar code reader for reading information from a bar code, comprising:
   means for generating a scanning light beam;
   means for detecting the scanning light beam after said scanning light beam is reflected from the bar code;
   a hologram receiving the scanning light beam in sequence from said generating means and then directing the scanning light beam to the bar code along one optical path so that the bar is scanned with the scanning light beam in two-dimensional directions, and for guiding the scanning light beam to said detecting means along sunstantially the same optical path after the scanning light beam is reflected from the bar code;
   means, disposed in an optical system between said detecting means and said hologram, for collecting reflected scanning light into said detecting means; and
   a light blocking member, disposed in an optical system between said collecting means and said hologram, for blocking the scanning light beam from entering, as unwanted light, into said detecting means after said scanning light beam is reflected by said hologram.

2. A bar code reader according to claim 1, wherein said hologram is formed on a circular hologram disk, and said hologram extending over an angular range of about 180° along a circumferential edge of the circular hologram disk, said hologram disk being disposed in a position tilted with respect to a vertical axis, said disk being driven by a motor, said bar code reader further including a polygonal reflecting mirror assembly disposed on a side of said holoogram disk opposite the generating means for reflecting the scanning light beam directed by said hologram, said polygonal reflecting mirror assembly having one side open and extending over a range of approximately 180° along the periphery of the circumference of said circular hologram disk, said motor being disposed on said open side of said polygonal mirror.

3. A bar code reader according to claim 2, wherein said polygonal reflecting mirror includes at least three flat reflecting mirrors disposed side-by-side substantially half of the full circumference of said halogram with free edges of the two outermost of said at least three reflecting mirrors extending beyond said range of approximately 180°.

4. A bar code reader according to claim 2, further including a reading window through which said scanning light beam is emitted onto the bar code to be read, and a second light blocking member disposed between said hologram disk and the bar code to be read for preventing the scanning light beam transmitted through said hologram disk from emitting through said reading window without reflection by said polygonal reflecting mirror assembly.

5. A bar code reader according to claim 4, wherein said collecting means comprises a condenser lens facing said hologram disk, said second light blocking member being opposite to and having the same area as an open area of said condenser lens.

6. A bar code reader according to claim 4 wherein said reading window has a shape substantially complementary in contour to the shape of said polygonal reflecting mirror assembly.

7. A bar code reader according to claim 2, further including an additional hologram provided on said circular hologram disk and extending contiguously with the first-mentioned hologram along another half of the full circumference of said circular hologram disk, said first-mentioned hologram and said additional hologram having different focal lengths and different diffraction angles.

8. A bar code reader according to claim 1 wherein said hologram is provided on a circular hologram disk, said collecting means being a condenser lens facing said hologram disk, said light blocking member including a light blocking tube extending through said condenser lens along an optical axis thereof and defining a path along which the scanning light beam advances toward said holograms, said light blocking tube having an end terminating close to said hologram disk.

9. A bar code reader according to claim 8, further including a reflecting mirror disposed on the opposite end of said light blocking tube and alignment with said generating means for reflecting the scanning light beam toward said hologram disk.

10. A bar code reader according to claim 1 wherein said hologram is provided on a circular hologram disk, said collecting means being a condenser lens facing said hologram disk, further including an elongate light guide member extending from said generating means parallel to the plane of said hologram disk and terminating in a bevelled end aligned with an optical axis of said condenser lens for guiding the scanning light beam from said generating means to said hologram disk, said light blocking member being disposed at least over said bevelled end of said light guide member.

11. A bar code reader according to claim 10 wherein said light guide member comprises a transparent prism, said light blocking member being further provided over all sides of said prism.

12. A bar code reader according to claim 10 wherein said light guide member comprises a transparent prism, said light blocking member covering distal end of said light guide member including said bevelled end.

13. A bar code reader according to claim 1 wherein said hologram is provided on a circular hologram disk, said collecting means being a condenser lens facing said hologram disk, further including an elongate light guide member extending from said generating means parallel to the plane of said hologram disk and terminating in a bevelled end aligned with an optical axis of said condenser lens, said light blocking member comprising a tubular light blocking member extending from said oblique end of said light guide member in perpendicular relation to the plane of said hologram disk and terminating immediately ahead of said hologram disk.

14. A bar code reader according to claim 1 wherein said hologram is provided on a circular hologram disk, said collecting means being a condenser lens facing said hologram disk, further including a light guide member for guiding the scanning light beam from said generating means to said hologram disk, said guide member being composed of an elongate bar of a reflecting mirror extending from said generating means parallel to the plane of said hologram disk and terminating in a bevelled end aligned with an optical axis of said condenser lens, and a reflecting mirror disposed on said bevelled end of said stay, and light blocking member being disposed between said condenser lens and said bar adjacent to said reflecting mirror.

15. A bar code reader according to claim 14 wherein said light guide member further includes an elongate bar of a reflecting mirror extending in juxtaposition with the first-mentioned bar, said light blocking member extending over and across said two bars.

16. A bar code reader according to claim 1 wherein said hologram is provided on a circular hologram disk, said collecting means being a condenser lens facing said hologram disk, further including a light guide member for guiding the scanning light beam from said generating means to said hologram disk, said guide member being composed of an elongate tubular bar of a reflecting mirror extending from said generating means parallel to the plane of said hologram disk and terminating in an bevelled end aligned with an optical axis of said condenser lens, and an angled reflecting mirror disposed on said bevelled end of said tubular stay, said tubular stay having an aperture for the passage of the scanning light beam after it is reflected by said bevelled reflecting mirror.

17. A bar code reader according to claim 1 wherein said hologram is provided on a circular hologram disk, said collecting means being a condenser lens facing said hologram disk, further including an elongate light guide member extending from said generating means parallel to the plane of said hologram disk and terminating in a bevelled end aligned with an optical axis of said condenser lens for guiding the scanning light beam from said generating means to said hologram disk, said light blocking member comprising an apertured light blocking member disposed between said bevelled end of said light guide member and said hologram disk.

18. A bar code reader according to claim 1 wherein said bar code reader is of the overhead type including a scanning unit adapted to be disposed above a path of movement of the bar code to be read and containing said generating means, said detecting means, said hologram, said collecting means and said light blocking member.

19. A bar code reader according to claim 18 further including a support member pivotally and vertically movably supporting there on said scanning unit.

20. A bar code reader according to claim 18 wherein said scanning unit includes a hollow lateral projection connected with said support member, said generating means being disposed in said lateral projection.

21. A bar code reader according to claim 18 wherein said hologram is provided on a circular hologram disk disposed in said scanning unit and driven by a motor disposed in said scanning unit.

22. A bar code reader according to claim 21 where said hologram extends along half of the full circumference of the circular hologram disk, further including a polygonal reflecting mirror assembly disposed behind said hologram disk for reflecting the scanning laser beam directed by said hologram, said polygonal reflecting mirror assembly having one side open and extending substantially along half of the full circumference of said circular hologram disk, said motor being disposed on said open side of said polygonal reflecting mirror assembly.

23. A bar code reader according to claim 22 wherein said polygonal reflecting mirror assembly includes at least three flat reflecting mirrors arranged side-by-side along substantially half of the full circumference of said hologram disk, free edges of endmost two of said at least three relecting mirrors extending beyond half of the full circumference of said hologram disk.

24. A bar code reader according to claim 22 wherein said scanning unit further includes a reading window through which said scanning light beam is emitted onto the bar code to be read, and a second light blocking member disposed between said hologram disk and the bar code to be read for preventing the scanning light beam transmitted through said hologram disk from emitting through said reading window without reflection by said polygonal reflecting mirror assembly.

25. A bar code reader according to claim 24 wherein said collecting means comprises a condenser lens facing said hologram disk, said second light blocking member being coextensive to an open area of said condenser lens.

26. A bar code reader according to claim 24 wherein said reading window has a shape substantially complementary in contour to the shape of said polygonal reflecting mirror assembly.

27. A bar code reader according to claim 22 wherein said collecting means comprises a condenser lens facing said hologram disk, said light blocking member including a light blocking tube extending through said condenser lens along an optical axis thereof and defining a path along which the scanning light beam advances toward said holograms, said light blocking tube having an end terminating close to said holgram disk.

28. A bar code reader according to claim 27, further including a reflecting mirror disposed on the opposite end of said light blocking tube and alignment with said generating means for reflecting the scanning light beam toward said hologram disk.

29. A bar code reader according to claim 22 wherein said collecting means comprises a condenser lens facing said hologram disk, further including an elongate light guide member extending from said generating means parallel to the plane of said hologram disk and terminating in a bevelled end aligned with an optical axis of said condenser lens for guiding the scanning light beam from said generating means to said hologram disk, said light blocking member being disposed at lease over said bevelled end of said light guide member.

30. A bar code reader according to claim 29 wherein said light guide member comprises a transparent prism, said light blocking member being further provided over all sides of said prism.

31. A bar code reader according to claim 29 wherein said light guide member comprises a transparent prism, said light blocking membr covering a distal end of said light guide member including said oblique end.

32. A bar code reader according to claim 22 wherein in said collecting means comprises a condenser lens facing said hologram disk, further including an elongate light guide member extending from said generating means parallel to the plane of said hologram disk and terminating in an oblique end aligned with an optical axis of said condenser lens, said light blocking member comprising a tubular light blocking member extending from said bevelled end of said light guide member in perpendicular relation to the plane of said hologram disk and terminating immediately ahead of said hologram disk.

33. A bar code reader according to claim 22 wherein said collecting means comprises a condenser lens facing said hologram disk, further including a light guide member for guiding the scanning light beam from said generating means to said hologram disk, said guide member being composed of an elongate bar of a reflecting mirror extending from said generating means parallel to the plane of said hologram disk and terminating in an oblique end aligned with an optical axis of said condenser lens, and a reflecting mirror disposed on said angled end of said bar, said light blocking member being disposed between said condenser lens and said bar adjacent to said reflecting mirror.

34. A bar code reader according to claim 33 wherein said light guide member further includes an elongate bar of a reflecting mirror extending in juxtaposition with the first-mentioned bar, said light blocking member extending over and across said two stays.

35. A bar code reader according to claim 22 wherein said collecting means comprises a condenser lens facing said hologram disk, further including a light guide member for guiding the scanning light beam from said generating means to said hologram disk, said guide member being composed of an elongate tubular bar of a reflecting mirror extending from said generating means parallel to the plane of said hologram disk and terminating in an angled end aligned with an optical axis of said condenser lens, and an angled reflecting mirror disposed on said angled end of said tubular stay, said tubular stay having an aperature for the passage of the scanning light beam after it is reflected by said angled reflecting mirror.

36. A bar code reader according to claim 22 wherein said collecting means comprises a condenser lens facing said hologram disk, further including an elongate light guide member extending from said generating means parallel to the plane of said hologram disk and terminating in an angled end aligned with an optical axis of said condenser lens for guiding the scanning light beam from said generating means to said hologram disk, said light blocking member comprising an apertured light blocking member disposed between said angled end of said light guide member and said hologram disk.

37. A bar code reader for reading information from a bar code, comprising:
means for generating a scanning light beam;
means for detecting the scanning light beam after said scanning light beam is reflected from the bar code;
a hologram receiving the scanning light beam in sequence from said generating means and then directing the scanning light beam to the bar code along one optical path so that the bar code is scanned with the scanning light beam in two-dimensional directions, and for guiding the scanning light beam to said detecting means along substantially the same optical path after the scanning light beam reflected from the bar code, said hologram being disposed on a rotatable circular hologram disk, said hologram extending along about 180° of a peripheral edge of the hologram disk's full circumference, said hologram disk being disposed at a position angled with respect to a vertical axis and driven by a motor;
a polygonal reflecting mirror assembly disposed on a side of said hologram disk opposite said generating means for reflecting the scanning laser beam directed by said hologram, said polygonal reflecting mirror assembly having an open side and extending substantially around 180° of the full circumference of said circular hologram disk, said motor being disposed on said open side of said polygonal mirror;
means, disposed in an optical system between said detecting means and said hologram, for collecting the reflected scanning light beam into said detecting means;
a light blocking member, disposed in an optical system between said collecting means and said hologram, for blocking the scanning light beam from entering, as unwanted light, into said detecting means after said scanning light beam is reflected by said hologram.

38. A bar code reader according to claim 37, wherein said bar code reader is an overhead type bar code reader and includes a scanning unit disposed above a path of movement of the bar code to be read, said scanning unit containing said generating means, said detecting means, said hologram including said hologram disk, said polygonal reflecting mirror, said collecting means, and said light blocking member.

39. A bar code reader according to claim 37, further comprising a reading window through which said scanning light beam is emitted onto the bar code to be read, and a second light blocking member disposed between said hologram disk and said bar code that prevents said scanning light beam transmitted through said hologram disk from emitting through said reading window without reflecting by said polygonal mirror assembly.

40. A bar code reader for reading information from a bar code, comprising:
means for generating a scanning light beam;
means for detecting the scanning light beam after said scanning light beam is reflected from the bar code;
a hologram receiving the scanning light beam in sequence from said generating means and then directing the scanning light beam to the bar code along one optical path so that the bar code is scanned with the scanning light beam in two-dimensional directions, and for guiding the scanning light beam to said detecting means along substantially the same optical path after the scanning light beam is reflected from the bar code, said hologram being disposed on a rotatable circular hologram disk, said hologram extending and along about 180° of a peripheral edge of the hologram disk's full circumference, said hologram disk being disposed at a position angled with respect to a vertical axis and driven by a motor;
a polygonal reflecting mirror assembly disposed on a side of said hologram disk opposite said generating means for reflecting the scanning laser beam directed by said hologram, said polygonal reflecting mirror assembly having an open side and extending substantially around 180° of the full circumference of said circular hologram disk, said motor being disposed on said open side of said polygonal mirror;
means, disposed in an optical system between said detecting means and said hologram, for collecting the reflected scanning light beam into said detecting means;
a reading window through which the scanning light beam is emitted onto the bar code to be read; and
a light blocking member, disposed in an optical system between said collecting means and said hologram, for blocking the scanning light beam from entering, as unwanted light, into said detecting means after said scanning light beam is reflected by said hologram.

41. A bar code reader according to claim 40, wherein said bar code reader is an overhead type bar code reader and includes a scanning unit disposed above a path of movement of the bar code to be read, said scanning unit containing said generating means, said detecting means, said hologram including said hologram disk, said polygonal reflecting mirror, said collecting means, said reading window and said light blocking member.

* * * * *